(12) United States Patent
Kanzow et al.

(10) Patent No.: US 8,262,523 B2
(45) Date of Patent: Sep. 11, 2012

(54) V-RIBBED BELT WITH IMPROVED NOISE PROPERTIES

(75) Inventors: Henning Kanzow, Hannover (DE);
Claus-Lüder Mahnken, Ahausen (DE);
Tobias Nonnast, Hannover (DE);
Marko Schleicher, Seelze (DE);
Reinhard Teves, Hannover (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 255 days.

(21) Appl. No.: 12/214,652

(22) Filed: Jun. 20, 2008

(65) Prior Publication Data
US 2008/0261739 A1    Oct. 23, 2008

Related U.S. Application Data

(63) Continuation of application No. PCT/EP2007/050311, filed on Jan. 15, 2007.

(30) Foreign Application Priority Data

Feb. 16, 2006 (DE) .................. 10 2006 007 509

(51) Int. Cl.
*F16G 1/04* (2006.01)
(52) U.S. Cl. ........................................ 474/268
(58) Field of Classification Search .................. 474/266, 474/237, 238, 242, 260, 267, 268, 270, 271
See application file for complete search history.

(56) References Cited

U.S. PATENT DOCUMENTS

| | | | |
|---|---|---|---|
| 2,459,897 A * | 1/1949 | Schwarz | 424/445 |
| 2,562,182 A * | 7/1951 | Godley | 427/250 |
| 3,542,633 A * | 11/1970 | Goldsmith | 442/29 |
| 3,724,284 A | 4/1973 | Eng et al. | |
| 3,981,206 A | 9/1976 | Miranti, Jr. et al. | |
| 4,027,545 A | 6/1977 | White, Jr. | |
| 4,169,021 A * | 9/1979 | Argentiero | 205/50 |
| 4,169,393 A | 10/1979 | Wetzel et al. | |
| 4,464,153 A | 8/1984 | Brew | |
| 5,232,409 A * | 8/1993 | Kanamori et al. | 474/260 |

(Continued)

FOREIGN PATENT DOCUMENTS

DE    40 25 132 C1    2/1992

(Continued)

OTHER PUBLICATIONS

International Search Report of PCT/EP2007/050311. Netzfashion Im Anwendungsstyle, Eine Kollektion Neuer, Mit Drei Legebarren Gearbeiteter Netzmuster, von Einer RS 3 EF-; Technical Textiles.

*Primary Examiner* — Robert A Siconolfi
*Assistant Examiner* — Stephen Bowes
(74) *Attorney, Agent, or Firm* — Collard & Roe, P.C.

(57) ABSTRACT

V-ribbed belts are formed by thermoplastic shaping and contain ribs that run at least on a first side in a longitudinal direction of the V-ribbed belt. The first side contains a layer composed of a textile warp-knit fabric made up of two different yarns. The warp-knit fabric is constructed from a first yarn composed of filaments with a module of more than 5N/1000 dtex, and a second yarn composed of filaments with a module of less than 2 cN/1000 dtex, both based on 5% extension. The first and second yarns form a coherent network and the yarns do not twine around one another. V-ribbed belts can be formed using an elastic warp-knit fabric, whose extension is based on the construction of the knitted fabrics. The belts maintain better noise reduction both in the new state and after a relatively long service life.

16 Claims, 3 Drawing Sheets

U.S. PATENT DOCUMENTS

| | | | |
|---|---|---|---|
| 5,415,594 A * | 5/1995 | Kitahama et al. | 474/263 |
| 5,515,701 A | 5/1996 | Schubert | |
| 5,842,080 A * | 11/1998 | Ashibe et al. | 399/49 |
| 6,352,488 B1 * | 3/2002 | Morris et al. | 474/263 |
| 6,491,598 B1 * | 12/2002 | Rosenboom | 474/260 |
| 6,620,068 B2 * | 9/2003 | Ito et al. | 474/205 |
| 2001/0044353 A1 * | 11/2001 | Nosaka et al. | 474/260 |
| 2002/0042317 A1 * | 4/2002 | South | 474/264 |
| 2002/0187869 A1 * | 12/2002 | Martin et al. | 474/260 |
| 2004/0000173 A1 * | 1/2004 | Keller | 66/170 |
| 2004/0009839 A1 * | 1/2004 | Edwards et al. | 474/260 |
| 2004/0048708 A1 * | 3/2004 | Nonnast et al. | 474/260 |
| 2004/0147186 A1 * | 7/2004 | Konishi et al. | 442/76 |
| 2005/0123715 A1 * | 6/2005 | Franzke et al. | 428/105 |
| 2006/0063627 A1 * | 3/2006 | Tomobuchi | 474/205 |

FOREIGN PATENT DOCUMENTS

| | | |
|---|---|---|
| EP | 0 662 571 | 7/1995 |
| EP | 1 088 177 | 9/2004 |
| FR | 2568275 A1 * | 1/1986 |
| WO | WO 2004/072345 A1 | 8/2004 |

\* cited by examiner

US 8,262,523 B2

V-RIBBED BELT WITH IMPROVED NOISE PROPERTIES

CROSS REFERENCE TO RELATED APPLICATIONS

This application is a continuation under 35 U.S.C. 120 of International Application No. PCT/EP2007/050311, filed on Jan. 15, 2007, which claims priority from German Application No. 10 2006 007 509.9 filed Feb. 16, 2006.

The invention relates to V-ribbed belts of elastomer Material with embedded tensile load-bearing elements, Which have ribs of a substantially wedge-shaped cross Section that extend at least on one side in the longitudinal direction of the V-ribbed belt and are formed by the rmoplastic shaping, and this forst side has a layer of a textile warp-knitted fabric comprising two different yarns.

U.S. Pat. No. 3,981,206 A describes a V-ribbed belt in which a textile fabric that can be stretched on two sides and comprises knitted filaments is vulcanized into the surface in the forming process, the textile fabric that is used comprising a combination yarn composed of filaments of elastic polyurethane (here the brand-name Spandex, also known as elastane, Dorlastan and Lycra) and polyamide twined around one another. In U.S. Pat. No. 4,027,545, specific details of the application of such V-ribbed belts are given and the specific setting of these belts is described.

Belts of these configurations have not so far been able to establish themselves on the market, since the combination filaments that are formed by twining elastane filaments around polyamide filaments are not durable and break. The twining of the two materials around one another then has the effect that the entire textile formation is liable to break and the belts often quickly fail under dynamic operating conditions in a motor.

In particular, the type of knitting preferred over the drawings used in this document has not proven to be successful, since it quickly breaks up.

The teaching disclosed in U.S. Pat. No. 4,169,393 attempts to overcome this disadvantage by the use of triaxial fabric, but even this measure has not been able to establish itself on the market because of poor dynamic durability.

The use of warp-knitted fabric on the surface of drive belts is already known. U.S. Pat. No. 3,724,284 describes a jacketed V-belt, the surface of which is covered with a warp-knitted textile layer comprising two different yarns, the textile layer being thermally treated to set a predetermined construction-dependent extension. Fabrics of this type of non-elastic materials are well-suited for jacketed V-belts and have proven to be successful for such belts even in cases in which the production costs for these belts are not so significant.

However, use of such textile layers in V-ribbed belts has not so far been possible. The extension of the textile layer is obtained solely by the construction of the textile layer. Therefore, the simultaneous extensibility in one direction for the forming of the ribs during production and in the other direction for the continuous dynamic loading during operation is not provided in the case of these textile layers.

U.S. Pat. No. 4,464,153 discloses a teaching by which V-belts are completely surrounded by the covering of a textile layer, for example a woven fabric. Experience shows that these coverings on jacketed V-belts do not stay on V-ribbed belts, since much greater extensions occur here in the fabric.

Apart from the durability of the belt surfaces, today the noise properties are likewise of great significance. Since the surface of the warp-knitted fabric is rough, undesired development of noise can occur during operation.

EP 662571 discloses coatings of belt surfaces to reduce friction coefficients by combined means in which fluoropolymers are incorporated in matrix materials without any boundary layers. However, this incorporation without any boundary layers is technically sophisticated and has not yielded such good noise reductions as materials that consist of fluoropolymers that are incorporated in carrier materials provided with boundary layers, such as for example polyurethanes.

EP 1088177 discloses a method in which a woven fabric is treated on one side with a wear-reducing material, which comprises a crosslinked matrix and is provided with sliding bodies. However, this method can only be applied to woven fabrics that do not allow coatings to pass completely through them. Warp-knitted fabric on the other hand cannot be treated by this method. Rather, the belt provided with warp-knitted fabric has to undergo subsequent treatment, since otherwise the warp knitted fabric will come away from the belt.

The invention is based on the object of providing a V-ribbed belt of the type described at the beginning which has reduced noise development with at the same time a long service life, while avoiding the disadvantages mentioned.

This object is achieved by the warp-knitted fabric being constructed from a first yarn composed of filaments with a modulus of more than 5N/1000 dtex, based on 5% extension, and a second yarn composed of filaments with a modulus of less than 2 cN/1000 dtex, based on 5% extension, the first yarn and the second yarn in each case forming a coherent network and the yarns not being twined around one another.

Such an elastic warp-knitted fabric, the extension of which is not based on the construction of the knitted fabric, allows good forming of V-ribbed belts. These V-ribbed belts according to the invention lead to long durability values during operation in motors along with low sound emissions. What is surprising is that the belts retain their good noise properties both in the new state and after a relatively long service life. The construction from two yarns, one of which is elastic the other non-elastic, ensures good processability of the warp knitted fabric.

In a development of the invention, the first yarn and the second yarn lie at least partially together in the loops.

This embodiment has the advantage that the respectively coherent networks of the yarns are joined together and so can be processed better. The fact that, although the yarns lie at least partially in common loops, they nevertheless form networks that are independent of one another, means that the warp-knitted fabric still remains stable and usable even if just one of the networks is destroyed, for example by abrasion.

In a further embodiment of the invention, the first yarn is constructed from polyamide filaments.

Polyamide has good tensile strength with at the same time good extension properties.

In a further embodiment of the invention, the first yarn is a polyamide with a weight per length of between 20 and 60 dtex.

Such a polyamide has a tensile strength that is particularly well suited for this application, with at the same time good extension properties.

In a further embodiment of the invention, the first yarn is constructed from polyester filaments.

Polyester has particularly good resistance to the temperatures occurring during the vulcanization of the V-ribbed belts and has good adhesiveness with respect to the surrounding elastomer matrix.

In a further embodiment of the invention, the second yarn is an elastic polyurethane.

As an elastic material, elastic polyurethane is well suited for forming the ribs of a V-ribbed belt during production.

In a further embodiment of the invention, the second yarn is an elastane with a total weight per length of 2 to 6 dtex.

This type of yarn has been found in tests to be particularly advantageous for the processability and noise development of the V-ribbed belts.

In a further embodiment of the invention, the warp-knitted fabric is knitted with two guide bars on the basis of the following pattern, namely guide bar 1 with elastic yarn in closed plain weave of the sequence 1-0-1/1-2-1 and guide bar 2 with non-elastic yarn in closed tricot weave of the sequence 2-3-2/1-0-1.

In a further embodiment of the invention, the warp-knitted fabric is constructed in counternotation.

With a warp knitted-fabric based on this construction, particularly good reduction of the sound emissions can be achieved during the operation of the V-ribbed belts. In this case, four types of laying are possible, namely yarn 1 or yarn 2 on the outside and the knitting direction in the direction of the belt or the knitting direction perpendicular to the direction of the belt. Of these four combinations, laying in the knitting direction has proven to be not only economically more favorable but also better in terms of dynamic durability. The polyamide fibres lying on the outside protect the network better from abrasion. Textile lying perpendicular to the knitting direction has the disadvantage that, at the tip of the belt, long yarns lie in the direction of the ribs and dynamically break prematurely. Fabric laid in the knitting direction behaves better dynamically, since only quite short pieces of yarn extend in the direction of the belt, and consequently the warp-knitted fabric is dynamically more stable. The construction in counternotation has in this case the advantage that the warp-knitted fabric distorts less during processing.

With the finished V-ribbed belts according to the invention, during operation there is first a deformation of the elastane layer, which as a noise-reducing layer settles uniformly between the rest of the polyamide network. Toward the end of the life of the belt, a loss of cohesion of the polyamide network then occurs. However, even in this case the belt remains free from noise, since the loops comprising the combination of elastane and polymer or polyester are deep within the rubber matrix. The structure of polyamide and elastane is preserved until the end of the life of the V-ribbed belt, so that on virtually all the motors tested no squealing noises occurred.

In a development of the invention, a noise-reducing antifriction coating is applied to the warp-knitted fabric.

In a further embodiment of the invention, the noise-reducing antifriction coating is constructed from a flexible carrier layer and sliding bodies.

In a further embodiment of the invention, the flexible carrier layer predominantly consists of polyurethane.

In a further embodiment of the invention, the sliding bodies consist of fluorine-containing polymers.

In a further embodiment of the invention, the sliding bodies consist of PTFE.

In individual applications, it is possible that even the use of the warp-knitted fabrics described cannot ensure a high degree of freedom from noise under all weather conditions and moisture conditions. In these cases, the V-ribbed belts may be provided with a noise-reducing antifriction coating on the surface of the textile fabric. The treatment of the belt with a combined layer of polyurethane and a lubricant, with preference from the range of fluoropolymers, proves to be particularly advantageous here specifically. By contrast with the fabric coverings in exclusively polyamide fabrics, here there is a positive connection of the polyurethanes of the covering means with the polyurethane of the elastane from the fabric, so that the freedom from squealing is surprisingly prolonged to the end of the life of the belt. That is many times longer than can be achieved with a covering of an elastane-free fabric.

In a further embodiment of the invention, the noise-reducing antifriction coating is made of a color other than that of the warp-knitted fabric or the elastomer material.

With the aid of the difference in color from the generally customary black to black-gray configuration, the state of wear of the fabric can be indicated. As long as the different color is visible, it is still serviceable; when the base color of the elastomer mixture or the textile comes through, changing the belt should be considered.

In a development of the invention, the V-ribbed belts have ribs of a substantially wedge-shaped cross section extending on their second side, opposite from the first side, likewise in the longitudinal direction of the V-ribbed belt, which ribs are formed from the elastomer material of the V-ribbed belt by machining, in particular by grinding.

Such belts can be advantageously used for the low-noise driving of other units, which, on account of the geometrical conditions of the drive train, have to be driven with the rear side of the V-ribbed belts. In this case, the difference in color can advantageously serve as a distinguishing feature of the two ribbed sides. Since the properties of the different ribs are different, it may be important how the V-ribbed belt is fitted. In the case of conventional double-sided V-ribbed belts, it is only with great difficulty that the formed side and the ground side can be visually distinguished from each other. The different color can therefore be advantageously used as a distinguishing feature.

In a development of the invention, the layer of warp-knitted fabric has a flock layer.

According to a further embodiment of the invention, the flock layer is formed from cotton flocks.

According to a further embodiment of the invention, the flock layer is formed from polyimide flocks.

According to a further embodiment of the invention, the flock layer is formed from aramid flocks.

According to a further embodiment of the invention, the flock layer is formed from viscose flocks.

In particularly critical applications, for example in the case of motors with extreme non-uniformity and lack of rainwater protection of the belt for construction reasons, it may be necessary to avoid the creation of noise specifically under the influence of large amounts of water. For this purpose, it proves to be particularly favorable to perform flocking of the ribbed side of the V-ribbed belts. By contrast with conventional V-ribbed belts, rubbing away of the flock layer is entirely prevented by the rough surface caused by the nature of the textile. The smooth metal sheave is no longer capable of attacking the flock base and rubbing the flock away entirely, as takes place under unfavorable conditions in the case of textileless surfaces with flock layers on smooth rubber surfaces.

Measuring results show that, with such textile-covered and at the same time flocked belts, for the first time noises are no longer produced even under the most unfavorable climatic conditions, even at the end of the life of the belt.

In a development of the invention, the warp-knitted fabric has an electrical conductivity.

According to a further embodiment of the invention, the warp-knitted fabric has an electrically conductive surface coating of a vapor-deposited metal.

According to a further embodiment of the invention, the warp-knitted fabric is constructed from electrically conductively coated yarns.

According to a further embodiment of the invention, the yarns of the warp-knitted fabric are vapor-coated with a metal.

According to a further embodiment of the invention, the yarns of the warp-knitted fabric are vapor-coated with silver.

Most V-ribbed belts must have electrical conductivity to prevent static charges. The simplest and least expensive possibility is to use an elastomer mixture that is itself conductive as a base and to choose a corresponding vulcanization program that can pass through the elastomer layer before the surface is fully vulcanized. However, this measure can lead to noises. Furthermore, this possibility does not exist in all cases, since other belt properties, such as for example a necessary low build-up of heat during operation of the belt, cannot be achieved by choosing conductive elastomer mixtures. In these cases, it is favorable to apply a conductive coating to the textile layer.

A further possibility is to provide the textile with a conductive layer by vapor deposition or by other methods. Best results are produced by layers of silver. There are two methods for this, namely vapor deposition or treatment of the finished knitted textile before processing or else producing the knitted fabric directly from metallized filaments. The expensive method of pretreatment of the textile in sheet form can consequently be replaced by a less costly filament treatment.

The invention is explained in more detail below on the basis of the drawing, in which.

Figure 1:
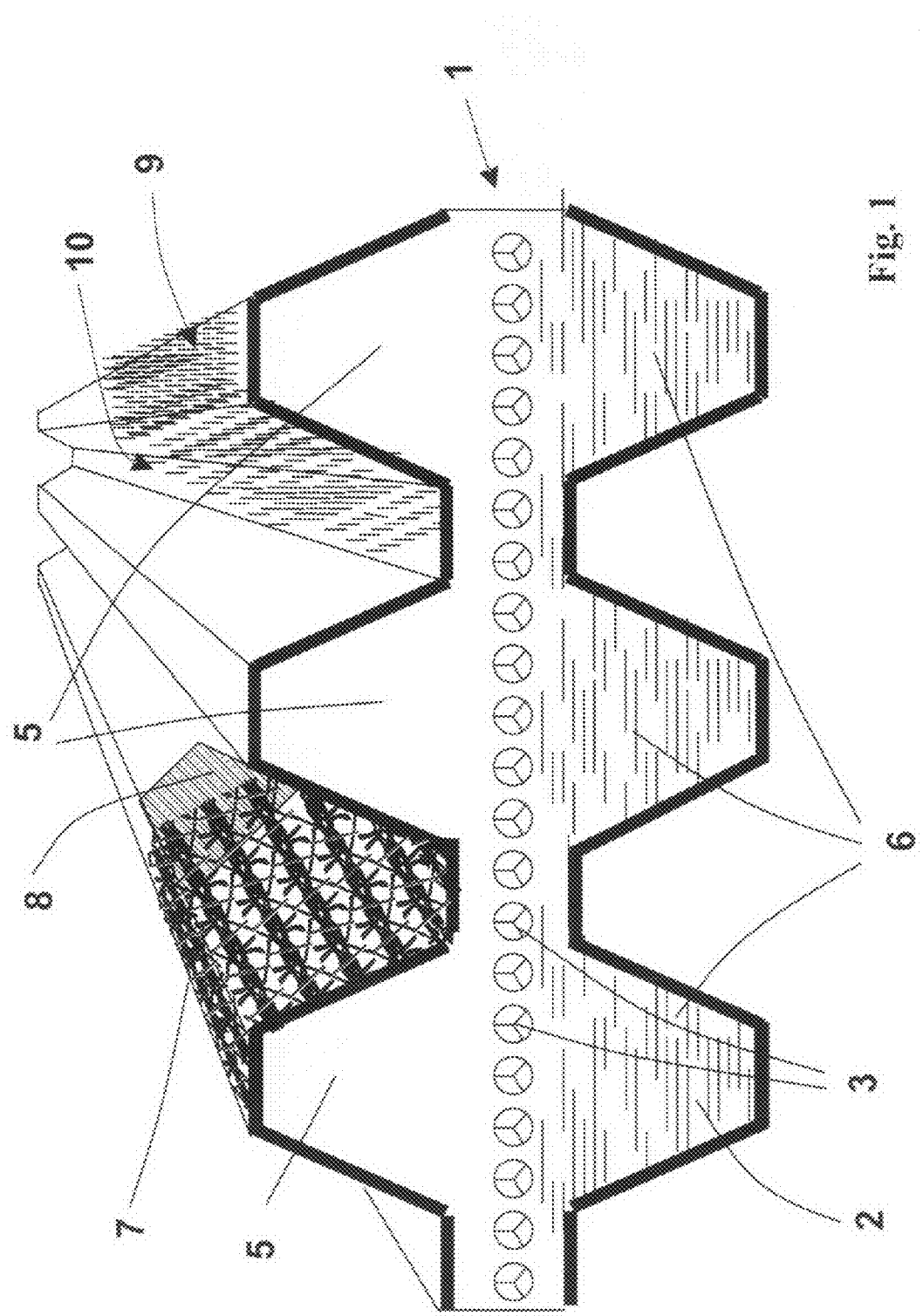
FIG. 1 shows a portion of a double-sided V-ribbed belt in a perspective basic representation.

In FIG. 1, a portion of the V-ribbed belt 1, which is constructed from an elastomer mixture 2 with embedded tensile load-bearing elements 3, is shown in a basic representation. The V-ribbed belt 1 has on its first side wedge-shaped ribs 5, which are aligned in the longitudinal direction of the V-ribbed belt 1 and were formed during production by vulcanization. The ribs 6 arranged on the opposite side are formed after full vulcanization of the V-ribbed belt 1 from the elastomer material 2 by grinding. For reasons of overall clarity, only three adjacent ribs are shown in each case here, but the V-ribbed belt 1 may have further ribs. The ribs 5 have a textile layer of a warp-knitted fabric 7, which is provided with an antifriction coating 8. The ribs 5 also have on their surface a flock layer 9, which reaches into the base 10 of the rib 6. Either an antifriction coating 8 or a flock layer 9 is applied to the layer of a warp-knitted fabric 7, on the entire surface of the warp-knitted fabric 7 of the V-ribbed belt 1. The layer of a warp-knitted fabric 7 covers the entire surface of all the ribs 5. Since this is only a basic representation here, only details of the layer of a warp-knitted fabric 7, the antifriction coating 8 and the flock layer 9 are respectively shown.

Figure 2:
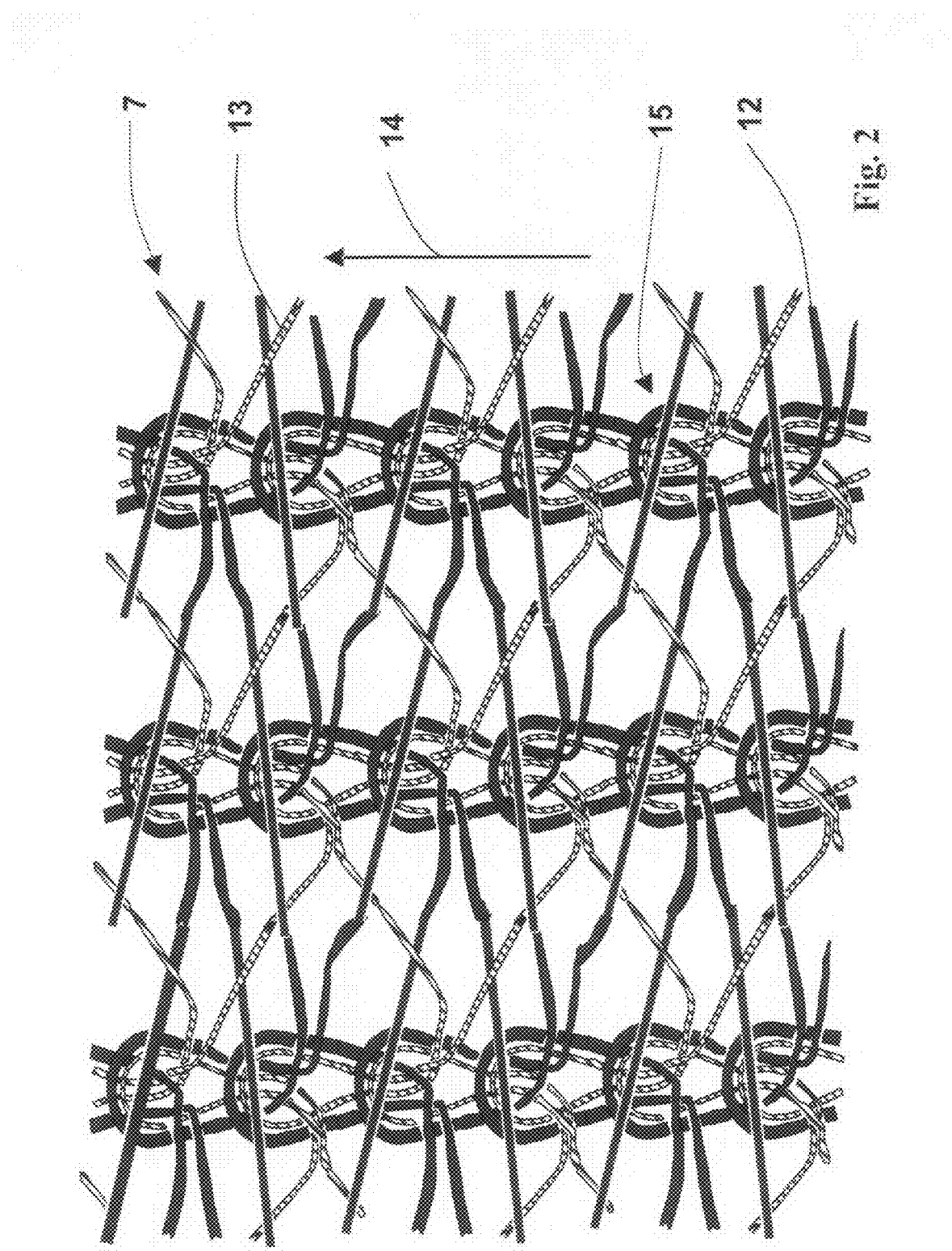
FIG. 2 shows a basic representation of the warp-knitted fabric according to the invention.

In FIG. 2, a partial detail of the layer of a warp-knitted fabric 7 is shown in a basic plan view. The layer of a warp-knitted fabric 7 is knitted from a first yarn 12 of elastane and a second yarn 13 of polyamide. In this representation, the knitting direction 14 runs from the lower edge of the figure to the upper edge of the figure and lies parallel to the running direction of the ribs, which are not visible here. The representation shows that the first yarn 12 is knitted on the basis of a knitting pattern in closed plain weave of the sequence 1-0-1/1-2-1 and the second yarn 13 is knitted on the basis of a knitting pattern in closed tricot weave of the sequence 2-3-2/1-0-1. The knitted fabric is embedded in an elastomer mixture (not shown here) of peroxidically crosslinked ethylene-propylene rubber. In all the loops 15 of the warp-knitted fabric 7, both yarns 12 and 13 are knitted together. However, the yarns 12 and 13 each in themselves form a closed network, which exists independently of the other.

Figure 3:
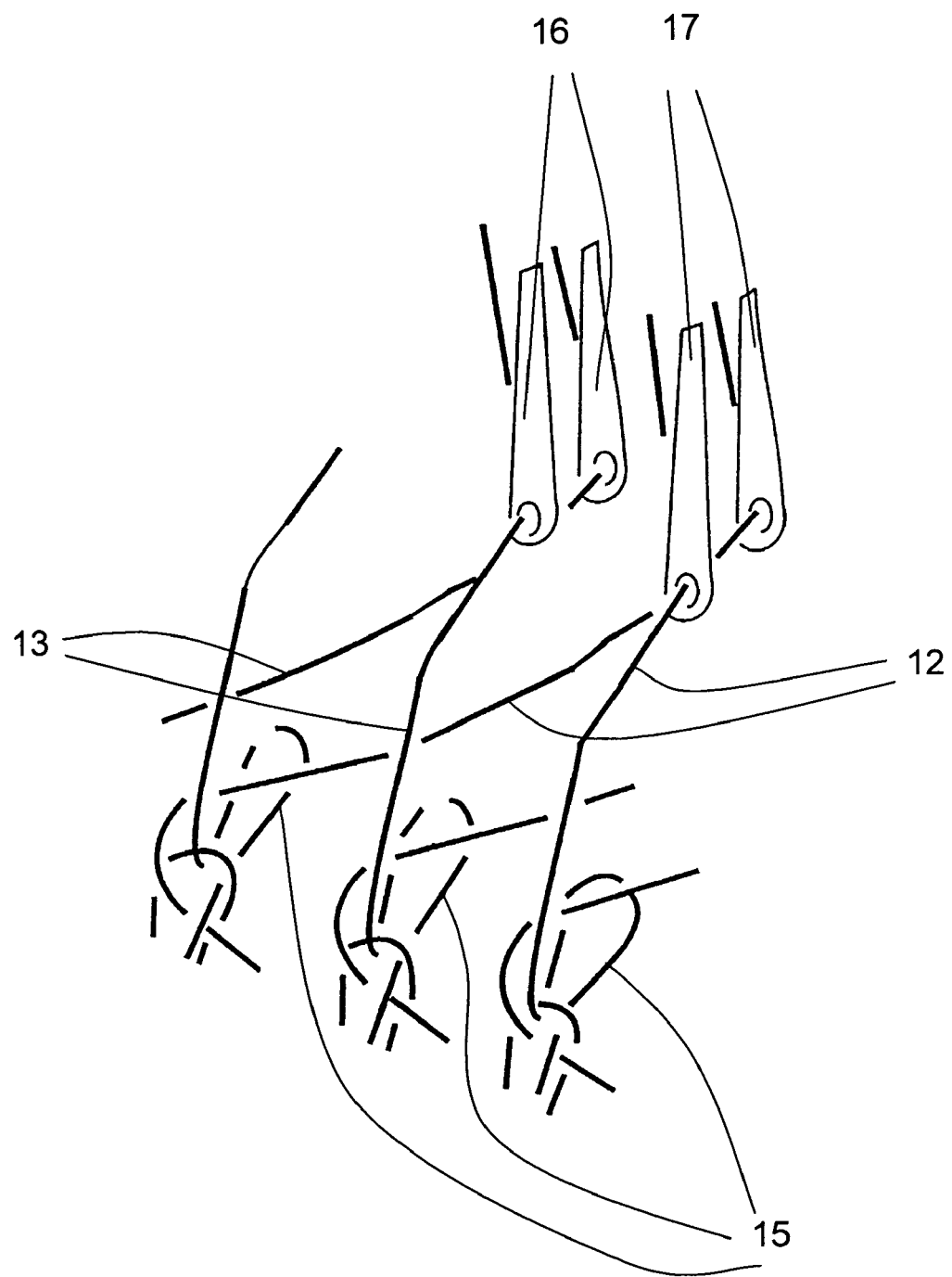
FIG. 3 shows a schematic representation of the production of a warp-knitted fabric.

FIG. 3 shows the warp-knitted fabric 7 of FIG. 2 being knitted using two guide bars 16, 17, the yarns 12, 13 running through guide bars 16 and 17 and pulled through the loops 15.

LIST OF DESIGNATIONS

1 V-ribbed belt
2 elastomer mixture
3 tensile load-bearing elements
5 ribs formed by vulcanization
6 ribs formed by grinding
7 layer of a warp-knitted fabric
8 antifriction coating
9 flock layer
10 base of the ribs 5
12 first yarn
13 second yarn
14 knitting direction
15 loops
16 guide bar
17 guide bar

The invention claimed is:

1. A V-ribbed belt (1) of elastomer material (2) with embedded tensile load-bearing elements (3),
which has ribs (5) of a substantially wedge-shaped cross section that extend at least on one side in the longitudinal direction of the V-ribbed belt (1) and are formed by thermoplastic shaping,
and this first side has a layer of a textile warp-knitted fabric (7) comprising two different yarns (12, 13),
wherein the warp-knitted fabric (7) is constructed from a first yarn (12) composed of filaments with a modulus of more than 5N/1000 dtex, based on 5% extension, and
a second yarn (13) composed of filaments with a modulus of less than 2 cN/1000 dtex, based on 5% extension,
the first yarn (12) and the second yarn (13) in each case forming a coherent network and the yarns (12, 13) not being twined around one another and wherein the warp-knitted fabric (7) is constructed in counternotation.

2. The V-ribbed belt as claimed in claim 1, wherein the second yarn (13) is an elastane with a weight per length ratio of 2 to 6 dtex.

3. The V-ribbed belt (1) as claimed in claim 1, wherein the warp-knitted fabric (7) is knitted with two guide bars on the basis of the following pattern, namely guide bar 1 (16) with the first yarn (12) in closed plain weave of the sequence 1-0-1/1-2-1 and guide bar 2 (17) with the second yarn (13) in closed tricot weave of the sequence 2-3-2/1-0-1.

4. The V-ribbed belt (1) as claimed in claim 1, wherein a noise-reducing antifriction coating (8) is applied to the warp-knitted fabric (7).

5. The V-ribbed belt (1) as claimed in claim 4, wherein the noise-reducing antifriction coating (8) is made of a color other than that of the warp-knitted fabric (7) or the elastomer material (2).

6. The V-ribbed belt (1) as claimed in claim 4, wherein the noise-reducing antifriction coating (8) is constructed from a flexible carrier layer and low friction particles.

7. The V-ribbed belt (1) as claimed in claim 6, wherein the flexible carrier layer predominantly consists of polyurethane.

8. The V-ribbed belt (1) as claimed in claim 6, wherein the low friction particles consist of fluorine-containing polymers.

9. The V-ribbed belt (1) as claimed in claim 6, wherein the low friction particles consist of PTFE.

10. The V-ribbed belt (1) as claimed in claim 1, wherein the V-ribbed belt (1) has ribs (6) of a substantially wedge-shaped cross section extending on their second side, opposite from the first side, in the longitudinal direction of the V-ribbed belt (1), which ribs are formed from the elastomer material of the V-ribbed belt (1) by machining.

11. The V-ribbed belt (1) as claimed in claim 10, wherein the V-ribbed belt (1) has ribs (6) of a substantially wedge-shaped cross section extending on their second side, opposite from the first side, in the longitudinal direction of the V-ribbed belt (1), which ribs are formed from the elastomer material of the V-ribbed belt (1) by grinding.

12. The V-ribbed belt (1) as claimed in claim 1, wherein the warp-knitted fabric (7) has an electrical conductivity.

13. The V-ribbed belt (1) as claimed in claim 12, wherein the warp-knitted fabric has an electrically conductive surface coating of a vapor-deposited metal.

14. The V-ribbed belt (1) as claimed in claim 12, wherein the warp-knitted fabric (7) is constructed from electrically conductively coated yarns (12, 13).

15. The V-ribbed belt (1) as claimed in claim 14, wherein the electrically conductive yarns (12, 13) are vapor-coated with a metal.

16. The V-ribbed belt (1) as claimed in claim 15, wherein the electrically conductive yarns (12, 13) are vapor-coated with silver.

\* \* \* \* \*